US008838261B2

(12) United States Patent
Stewart et al.

(10) Patent No.: US 8,838,261 B2
(45) Date of Patent: Sep. 16, 2014

(54) AUDIO CONFIGURATION BASED ON SELECTABLE AUDIO MODES

(75) Inventors: William G Stewart, Los Altos, CA (US); Andrew E Rostaing, San Francisco, CA (US); Anthony J Guetta, San Carlos, CA (US); Eric J Johnson, San Jose, CA (US); Gregory R Chapman, San Jose, CA (US); Deepak Iyer, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 363 days.

(21) Appl. No.: 13/294,922

(22) Filed: Nov. 11, 2011

(65) Prior Publication Data

US 2012/0310393 A1 Dec. 6, 2012

Related U.S. Application Data

(60) Provisional application No. 61/493,359, filed on Jun. 3, 2011.

(51) Int. Cl.
*G06F 13/00* (2006.01)
*G06F 3/16* (2006.01)
*H04M 1/725* (2006.01)
*G06F 3/00* (2006.01)

(52) U.S. Cl.
CPC ........... *H04M 1/72522* (2013.01); *G06F 3/165* (2013.01)
USPC ..................... 700/94; 719/329; 710/5; 710/36

(58) Field of Classification Search
CPC ............. G06F 3/165; G06F 3/16; G06F 9/52; H04M 1/72522; H04N 21/2368; H04N 21/4341
See application file for complete search history.

(56) References Cited

U.S. PATENT DOCUMENTS

| 7,861,008 | B2 | 12/2010 | Batson et al. | |
|---|---|---|---|---|
| 8,041,438 | B2 | 10/2011 | Batson et al. | |
| 8,095,694 | B2 | 1/2012 | Rostaing et al. | |
| 8,111,837 | B2 | 2/2012 | Guetta et al. | |
| 8,140,714 | B2 | 3/2012 | Batson et al. | |
| 8,171,177 | B2 | 5/2012 | Rostaing et al. | |
| 2009/0005892 | A1* | 1/2009 | Guetta et al. | 700/94 |
| 2009/0187967 | A1* | 7/2009 | Rostaing et al. | 726/1 |

OTHER PUBLICATIONS

PCT International Search Report and Written Opinion of the International Searching Authority for PCT/US2012/037428 mailed Aug. 13, 2012.
PCT International Preliminary Report on Patentability for PCT/US2012/037428 mailed Dec. 19, 2013.
U.S. Appl. No. 12/895,464, filed Sep. 30, 2010, 46 pages.

* cited by examiner

*Primary Examiner* — Curtis Kuntz
*Assistant Examiner* — Thomas Maung
(74) *Attorney, Agent, or Firm* — Blakely, Sokoloff, Taylor & Zafman LLP

(57) ABSTRACT

An operating system of a device receives, from an application executing on that device, data that identifies a category of hardware resources that the application needs to use in order to function. That category is mapped to a specified set of hardware resources of the device. The operating system also receives, from the application, data that identifies a mode. The mode corresponds to an intended use of a set of hardware resources and is mapped to a group of hardware resource settings that are consistent with the intended use. The operating system allocates, to the application, a particular set of hardware resources that are mapped to the category. The operating system configures one or more hardware resources in the particular set of hardware resources in conformity with a particular group of settings that are mapped to the mode.

26 Claims, 5 Drawing Sheets

AUDIO CONFIGURATION BASED ON SELECTABLE AUDIO MODES

CLAIM OF PRIORITY

This application claims priority under 35 U.S.C. §119 to U.S. Provisional Patent Application Ser. No. 61/493,359, titled "AUDIO CONFIGURATION BASED ON SELECTABLE AUDIO MODES," filed Jun. 3, 2011, the entire contents of which application are incorporated by reference herein.

CROSS-REFERENCE TO RELATED APPLICATIONS

This application is related to the following U.S. Patents and U.S. Patent Applications, the contents of each of which are incorporated by reference herein: U.S. Pat. No. 7,861,008, titled "MEDIA MANAGEMENT AND ROUTING WITHIN AN ELECTRONIC DEVICE," filed Jun. 28, 2008; U.S. Pat. No. 8,041,438, titled "DATA-DRIVEN MEDIA MANAGEMENT WITHIN AN ELECTRONIC DEVICE," filed Jun. 28, 2007; U.S. Pat. No. 8,111,837, titled "DATA-DRIVEN MEDIA MANAGEMENT WITHIN AN ELECTRONIC DEVICE," filed Apr. 18, 2008; U.S. Pat. No. 8,171,177, titled "ENHANCEMENTS TO DATA DRIVEN MEDIA MANAGEMENT WITHIN AN ELECTRONIC DEVICE," filed Mar. 16, 2009; and U.S. Pat. No. 8,140,714, titled "MEDIA MANAGEMENT AND ROUTING WITHIN AN ELECTRONIC DEVICE," filed Dec. 28, 2010.

FIELD OF THE INVENTION

The present invention relates to a technique for configuring a device's hardware resource settings in conformity with a mode of intended use specified by an application executing on that device.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computing devices can often handle recording and playback of multiple types of media. The media that may be recorded and played back by computing devices often includes numerous forms/formats of video, and numerous forms/formats of audio. Within such computing devices, many applications may be competing to record or play back media. Examples of types of applications that may attempt to record or play back media within a handheld computing device include, for example, a telephone application, a web browser, an e-mail application, short message service (SMS), a music player, and video player.

Within computing devices, the various software applications that record or play back the media can all contend for use of the various audio resources, and have different rules and protocols for doing so. Some of these rules and protocols may conflict from one application to another.

To complicate things further, many computing devices also have multiple possible inputs and outputs for recording and playback of the media. For example, a handheld computing device may have a line out port, a headphone port, a docking port, and multiple speakers, each of which may serve a different function and have different capabilities.

One way to handle the contention among the applications for the recording and playback resources of a computing device is to design each application with logic to check the state of settings of the device, letting each application decide for itself where, when and how to record or play its media. Unfortunately, using this approach, each software application developer has to implement code for a behavior tree that attempts to take into account the variety of factors that can impact media recording and playback on a device. The result may be less-than-optimal media handling decisions made by more-complex-than-necessary applications.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An operating system of a device maintains a stored set of mappings between category identifiers and sets of hardware resources. The operating system further maintains a stored set of mappings between mode identifiers and groups of settings that are applicable to various ones of those sets of hardware resources. Each group of settings corresponds to a different intended use of a set of hardware resources, such that when the hardware resources in that set are configured with those settings, those hardware resources become configured particularly appropriately for the corresponding intended use or purpose—even though such a configuration might not be ideal for all conceivable uses of those hardware resources.

The operating system receives, from an application executing on the device, data that specifies a category identifier that identifies a set of hardware resources that the application needs to use in order to function. The operating system also receives, from the application, data that specifies a mode identifier. The operating system allocates, to the application, a particular set of hardware resources that are mapped to the identified category in the stored set of mappings. The operating system configures one or more hardware resources in the particular set of hardware resources in conformity with a particular group of settings that are mapped to the mode in the stored set of mappings.

Embodiments of the invention allow devices to be configured for specific uses and for specific application scenarios.

Example Handheld Device

The techniques described herein for handling the playback of media within a device may be applied to any type of electronic device for which multiple applications compete for limited playback resources. Handheld electronic devices, such as personal digital assistants and mobile phones, are merely examples of devices to which the techniques may be applied. However, for the purpose of explanation, examples of the techniques shall be given with reference to handheld devices.

Figure 1:
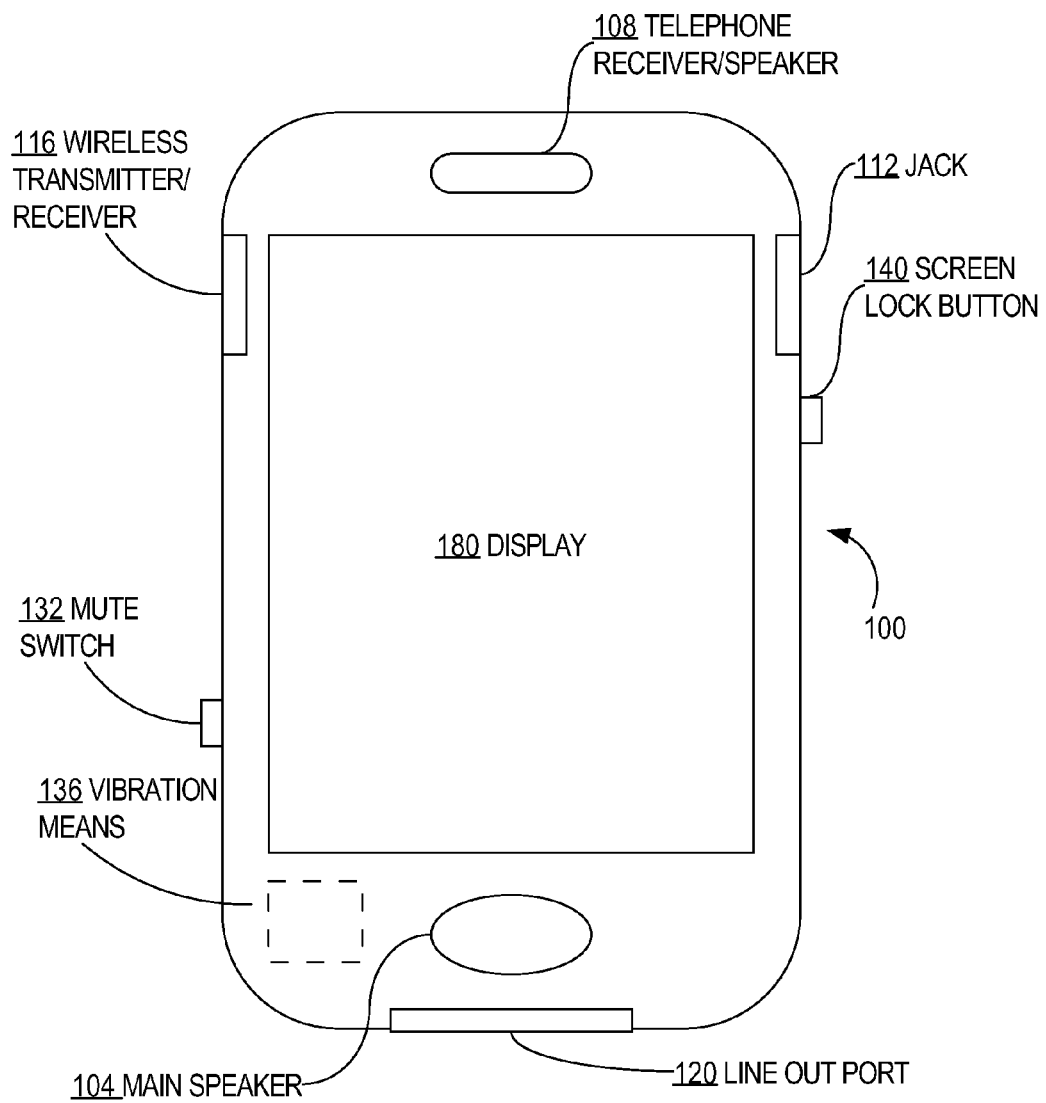
FIG. 1 is a block diagram of a handheld device.

FIG. 1 shows an example handheld device 100. The handheld device illustrated in FIG. 1 is but an example, so that devices other than that shown in FIG. 1 are also contemplated within the spirit and scope of the embodiments described herein. As shown in FIG. 1, the device 100 comprises at least a display 180 (which may or may not be touch-sensitive), a main speaker 104, a telephone receiver/speaker 108, a jack 112 for either headphones (listen only) or headset (listen and talk), a wireless transmitter/receiver 116 such as but not limited to Bluetooth®, and a line out port 120 (suitable for a docking station used by e.g. larger home-audio system). Handheld device may also include a screen lock button 140. Other types of speakers, buttons, switches, and audio ports may also be included. As stated, the device 100 is but one possible embodiment, so that the techniques described herein are not limited exclusively thereto.

The telephone receiver/speaker 108 may be similar to a receiver used within a conventional telephone. The touch-sensitive version of the display 180 may at times depict a keypad which in turn can generate sounds when touched.

The device 100 further comprises a mute switch 132, and a vibration means 136. A mechanism for enabling/disabling the vibration means 136 is available through the display 180 by accessing a software application loaded on the device 100.

Software applications that may be resident on the device 100 include but are not limited to e-mail, telephone, voicemail, web-browser, short messaging service (SMS), entertainment player either for music or video, camera, and slideshow (with music accompaniment).

The speaker may play keypad sounds (clicks) and notify the user that certain steps and key-actions may be illogical or not permissible (beeps). However, under certain circumstances this policy can be overridden.

Figure 2:
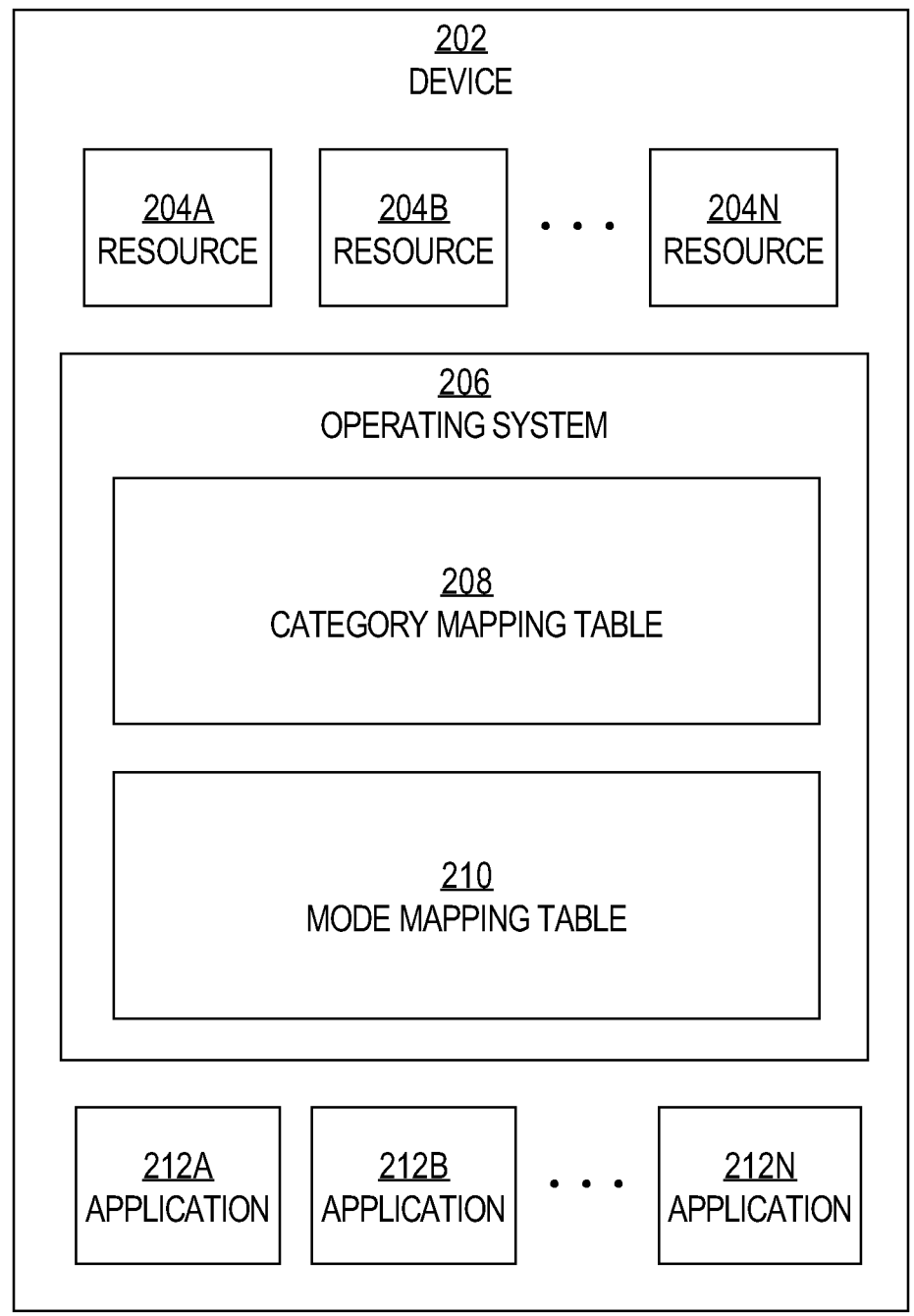
FIG. 2 is a block diagram illustrating functional components of a handheld device.

FIG. 2 is a block diagram illustrating functional components of a handheld device. Device 202 includes resources 204A-N. Resources 204A-N may include speakers, jacks, ports, switches, displays, microphones, etc. Different speakers, such as a loudspeaker and a telephone receiver speaker, may be positioned at different locations on the device (e.g., front, back, left side, right side, top, bottom, etc.). Different microphones may be positioned at different locations on the device (e.g., front, back, left side, right side, top, bottom, etc.). Resources 204A-N also may include functional modules such as signal processing modules, which may be implemented in software.

An operating system 206 executes on device 202. Operating system 206 maintains a category mapping table 208 and a mode mapping table 210, both of which are persistently stored within a storage medium of device 202. Various applications 212A-N also execute on device 202. Applications may be downloaded over an Internet connection to device 202 and persistently stored within a storage medium of device 202. Generally, applications 212A-N request the use of various combinations of resources 204A-N from operating system 206, which acts as a manager of resources 204A-N. Operating system 206 responds to such application requests by selecting sets of resources to allocate, at least temporarily, to the requesting applications. Applications 212A-N request the use of resources 204A-N by invoking methods of an application programming interface (API) exposed to applications 212A-N by operating system 206. Operating system 206 maintains records that indicate which resources 204A-N are allocated to which applications 212A-N at any given time.

Category Mapping Table

Figure 3:
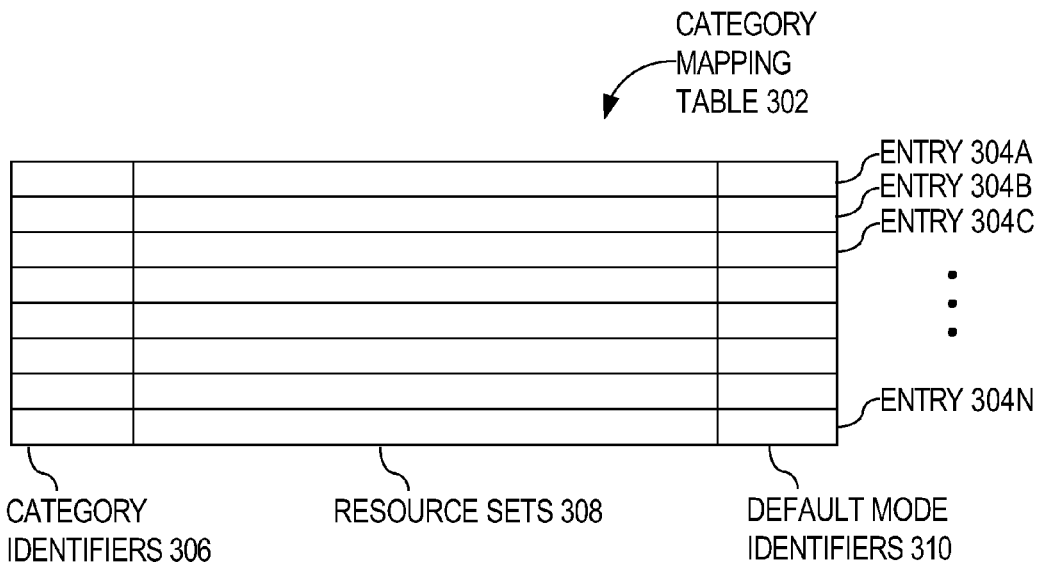
FIG. 3 is a block diagram that illustrates an example of a category mapping table.

As is discussed above, operating system 206 maintains category mapping table 208. FIG. 3 is a block diagram that illustrates an example of a category mapping table. Referring to FIG. 3, category mapping table 302 includes multiple entries 304A-N. Each of entries 304A-N includes a unique category identifier 306. Each of entries 304A-N maps the category identifier for that entry to a separate resource set 308. Each such resource set may indicate a different subset of resources 204A-N. For example, entry 304A may map a first category identifier to a first set of resources including only resources 204A and 204B, while entry 304B may map a second category identifier to a second set of resources including only resources 204B and 204C, while entry 304C may map a third category identifier to a third set of resources including only resources 204A, 204B, and 204C.

The abstract description of the capabilities/intended usage for each of the categories of category mapping table 302 are published to developers of applications 212A-N in advance of the development of those applications. Consequently, developers of applications 212A-N are aware of the sets of resources that are mapped to each different category identifier. The developers use this knowledge to design and program applications 212A-N in such a way that those applications request a correct subset of resources 204A-N that those applications need in order to function (i.e., the subset of resources 204A-N without which those applications cannot function correctly, and without which those applications may either terminate when unavailable for allocation or may try to activate a substitute resource from a different category). Inasmuch as each subset of resources in category mapping table 302 is mapped to a different category identifier, the application developers may create applications 212A-N in such a way that those applications request various resources 212A-N from operating system by reference to the category identifier that corresponds to the subset of resources 212A-N that those applications require. For example, a developer who knows that application 212A requires only resources 204A and 204B (and can function correctly without any other resources) will know that entry 304A maps the first category identifier to the first set of resources including only resources 204A and 204B. Consequently, that developer may code application 212A to invoke a resource-requesting method of the API exposed by operating system 206, passing the first category identifier as a parameter to that method, to indicate that application 212A requires the allocation of resources 204A and 204B. For another example, a developer who knows that application 212B requires only resources 204B and 204C (and can function correctly without any other resources) will know that entry 304B maps the second category identifier to the second set of resources including only resources 204B and 204C. Consequently, that developer may code application 212B to invoke a resource-requesting method of the API exposed by operating system 206, passing the second category identifier as a parameter to that method, to indicate that application 212B requires the allocation of resources 204B and 204C.

Beneficially, by associating subsets of resources 204A-N with different category identifiers, category mapping table 302 eliminates the need for applications to pass multiple parameters, each identifying a separate one of resources 204A-N, to the resource-requesting method; a single category identifier may be passed as a parameter to that method instead. Category identifiers may be mapped to subsets of resources 204A-N that are commonly used by certain segments of applications 212A-N (e.g., game applications, video chat applications, voice-only chat applications, audio playing applications, etc.), so that these category identifiers can be re-used by multiple applications requiring the same general categories of resources 204A-N. In category mapping tables of different devices, the same category identifier may be mapped to different sets of resources, since different devices may possess different resource sets. Thus, in a first device, a particular category identifier may be mapped to a first set of resources, while in a second device, that same particular category identifier may be mapped to a second set of resources.

In one embodiment, each of entries 304A-N additionally indicates a default mode identifier 310 for that entry (and, thus, for that category). Each of entries 304A-N may indicate a different default mode (though some entries may share a default mode). Modes are discussed in greater detail below.

Mode Mapping Table

Figure 4:
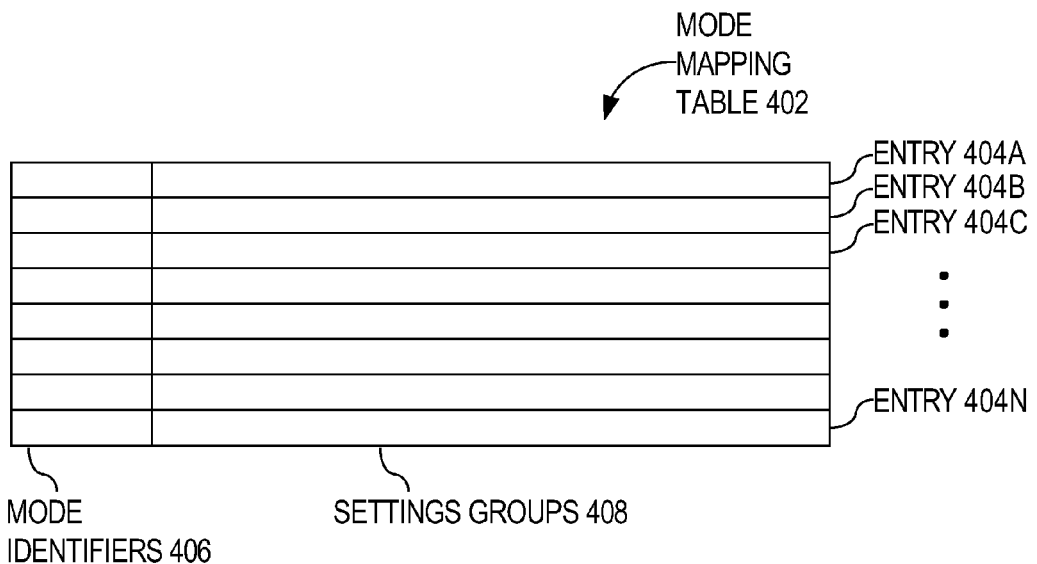
FIG. 4 is a block diagram that illustrates an example of a mode mapping table, according to an embodiment of the invention.

As is discussed above, operating system 206 maintains mode mapping table 210. FIG. 4 is a block diagram that illustrates an example of a mode mapping table, according to an embodiment of the invention. Referring to FIG. 4, mode mapping table 402 includes multiple entries 404A-N. Each of entries 404A-N includes a unique mode identifier 406. Each of entries 404A-N maps the mode identifier for that entry to a separate settings group 408. Settings groups generally indicate configuration settings for various ones of resources 204A-N. For example, the settings group for entry 404A may indicate a first volume setting for a first speaker and a first sensitivity setting for a microphone, while the settings group for entry 404B may indicate a second, different, volume setting for the first speaker, but no sensitivity setting for any microphone, while the settings group for entry 404C may indicate a third, different, volume setting for a second speaker, and a second, different sensitivity setting for the microphone. Thus, different settings groups may contain settings for different ones of resources 204A-N. Although multiple settings groups may contain settings for a specific one of resources 204A-N (e.g., a particular microphone or speaker), the settings for that specific resource may vary between those settings groups. For example, although two settings groups may both contain settings for resource 204A, the first settings group may specify a first setting for resource 204A, while the second settings group may specify a second setting for resource 204A. Each settings group may indicate one or more (resource, setting list) pairs, in which the setting list in a given pair indicates the values that are applicable to the settable attributes for the resource of that pair.

Generally, each settings group pertains to a different intended use or purpose for a subset of resources 204A-N. Indeed, the mode identifier that is mapped to a particular settings group may be in the form of a string that is suggestive, to a developer, of the intended use or purpose corresponding to that mode. One settings group may specify settings that are especially appropriate for a first type of application, in that configuring a subset of resources with those settings causes that type of application to function optimally for its purpose; yet those settings may be entirely inappropriate and unsuitable for a second type of application. Similarly, another settings group may specify settings that are especially appropriate for the second type of application, in that configuring a subset of resources with those settings causes that type of application to function optimally for its purpose; yet those settings may be entirely inappropriate and unsuitable for the first type of application.

Multiple different modes may be applicable, under different circumstances, to the same set of resources. Conversely, a single mode may be applicable to different sets of resources. The de-coupling of settings from resources via the separation of the category and mode tables allows for greater versatility and increased re-use of modes. Beneficially, this de-coupling avoids the potential proliferation of categories that might otherwise result if each category were required to have one, and only one, corresponding and static group of settings. Application developers may look to existing modes, with their already-defined groups of settings, in order to locate those modes that are most appropriate for their applications.

An abstract description of the capabilities/intended usage for each of the modes of mode mapping table 402 are published to developers of applications 212A-N in advance of the development of those applications. Consequently, developers of applications 212A-N are aware of the groups of settings that are mapped to each different mode identifier. The developers use this knowledge to design and program applications 212A-N in such a way that those applications request a most appropriate group of settings for the resources that will be allocated to those applications. Inasmuch as each settings groups in mode mapping table 402 is mapped to a different mode identifier, the application developers may create applications 212A-N in such a way that those applications request that their allocated resources be configured in conformity with a particular settings group by reference to the mode identifier that corresponds to that particular settings group. For example, a developer who knows that the application 212A has a first intended use, and therefore that the resources allocated to application 212A should be configured with settings that are consonant with that use, will know that entry 404A maps a first mode identifier to a first settings group that specifies settings appropriate (even ideal) for that first intended use. Consequently, that developer may code application 212A to invoke a resource-requesting method of the API exposed by operating system 206, passing the first mode identifier as a parameter to that method, to indicate that the resources requested by application 212A are to be configured according to settings in the first settings group. For another example, a developer who knows that the application 212B has a second intended use (different from the first intended use), and therefore that the resources allocated to application 212B should be configured with settings that are consonant with that use, will know that entry 404B maps a second mode identifier to a second settings group that specifies settings appropriate (even ideal) for that second intended use. Consequently, that developer may code application 212B to invoke a resource-requesting method of the API exposed by operating system 206, passing the second mode identifier as a parameter to that method, to indicate that the resources requested by application 212B are to be configured according to settings in the second settings group.

In one embodiment, when any of applications 212A-N invokes the resource-requesting method of operating system 206, that application passes, as parameters to that method, a category identifier and zero or more mode identifiers. In response to the invocation of the method, operating system 206 allocates, to the application, those of resources 204A-N that are mapped to the category identifier via category mapping table 302 (if those resources are available). Additionally, if a mode identifier is passed as parameters to the method, then operating system 206 responsively configures the resources allocated to the application with the values that are specified in the settings group that is mapped to that mode identifier via mode mapping table 402. In one embodiment, if no mode identifiers are passed as parameters to the method, then operating system 206 acts as though the default mode identifier mapped to the specified category identifier in category mapping table 302 had been passed as a parameter, and responsively configures the resources allocated to the application with the values that are specified in the settings group that is mapped to the category's default mode identifier via mode mapping table 402. In mode mapping tables of different devices, the same mode identifier may be mapped to different groups of settings, since different devices may require different settings for the same resources. Thus, in a first device, a particular mode identifier may be mapped to a first group of settings, while in a second device, that same particular mode identifier may be mapped to a second group of settings.

Contrast to Direct Application Control of Settings

Embodiments of the invention may be contrasted to systems in which an application was in direct control of the settings for the resources that the application used. In such systems, applications set up audio hardware directly. In such systems, applications would explicitly set up any audio processing that those applications required. In such systems, applications would directly choose which audio inputs and outputs those applications would use. In such systems, each application would, itself, set up a device's resources in a manner that made sense for that application. In a way, each application had "manual" control over hardware resource settings.

For example, in systems that permitted direct application control of settings, an application that accepted audio input might have directly configured the gains for a microphone of the device. For another example, such an application might have directly configured which of several inputs of the device (e.g., a microphone plugged into a headset jack of a mobile phone device and/or digital input being received via a Universal Serial Bus (USB) on the same mobile phone device) were going to be used to accept audio data, and what the settings for those inputs were going to be. The application itself might have individually and separately specified and configured the audio inputs that made sense for that application. For another example, in such systems, an application might have directly specified, separately and individually, the various algorithms and software processing modules that the application would be using to process audio input received through the specified audio inputs. The application might have separately specified a particular latency setting that affected the size of data chunks with which the application would deal over any particular period of time. The application might have separately specified a sample rate at which incoming audio data would be sampled. Such an application similarly might have specified settings for audio output resources of the device. Significantly, such applications would have specified each of these elements separately and individually; the burden would have fallen upon the application developers to handle each and every resource and its setting in an individual manner.

Where each application operating under the direct application control scheme specifies its own resources and settings separately and without regard to the manner in which other applications might operate, there is no guarantee that there will be any rhyme or reason in the way that various different applications—even applications having similar purposes—would use and configure a device's resources. Furthermore, under the direct application control scheme, each application might need to be specially programmed to determine the kind of device on which that application was executing (e.g., an iPhone, an iPod, or an iPad), before specifying the resources and settings that the application would use. The same application executing on an iPhone might have had a considerably different set of resources available to it than an application executing on an iPad, for example, and the settings appropriate and suitable for the resources on one kind of device might not be appropriate of suitable for the resources on the other kind of device, due potentially in part to the different sizes and relative positions of the resources on each device. Application developers found it burdensome to specially program applications to configure, differently, the resources that their applications would be using when executing on various different devices.

Categories Contrasted with Modes

U.S. Pat. No. 7,861,008, titled "MEDIA MANAGEMENT AND ROUTING WITHIN AN ELECTRONIC DEVICE," discloses a technique in which different subsets of a device's hardware resources may be mapped to different category identifiers. Using this technique, an application executing on a device may, instead of separately and individually specifying each device resource that the application will use, inform the device's operating system that the application will be using the subset of resources that are mapped to a particular category identifier. Applications that have similar purposes, and therefore tend to use similar resources, may refer to the same category identifier when requesting, from the operating system, the allocation of the subsets of the device's resources to those applications. The use of such resource categories therefore simplifies the task of application developers, who may easily locate the documented categories that best fit the resource needs of their applications. When the use of such resources categories becomes widely adopted among application developers, applications which have similar purposes and uses (e.g., voice chat) will tend to exhibit similar and expected behaviors with regard to the resources that they use (due to those applications specifying the same resource categories), thereby easing the learning curve of users who may be familiar with different applications having similar purposes; an audio input, switch, or button in one application is likely to have the same function as the same audio input, switch, or button in another application so long as those applications generally have the same purpose.

Additionally, because the operating system of one type of device (e.g., an iPhone) may be designed to map a particular category identifier to a potentially different set of resources than an operating system of another, different type of device (e.g., an iPad), application developers are spared the burden of compensating for differences in the resources that various types of devices provide; by programming an application to refer to a category identifier rather than separate, individual resources, the application developer pushes, to the operating system, the burden of compensating for differences in resources offerings among different device types. The ability to program an application to specify, to the operating system, the particular category of resources that the application desires to use, makes it easier for application developers to develop applications that function on a multitude of different device types having different hardware and processing resources.

Techniques disclosed herein extend the identifier-to-subset mapping idea from mere device resource categories to resource setting modes. Techniques disclosed herein add a layer of abstraction in relation to the configuration of device resources with specific settings. Using techniques disclosed herein, an application developer can, in addition to programming his application to specify a category identifier that is mapped to a subset of device resources that the application will use, program his application to specify a mode identifier that is mapped to a group of settings with which those device resources should be configured. Thus, techniques disclosed herein spare the application developer from needing to individually and separately specify, in application program code, the settings with which each separate resource should be configured. Instead, using techniques disclosed herein, an application developer may program his application to specify, to a device's operating system, a particular setting mode that is most appropriate for the purpose of that application (e.g., voice-only chat mode, or audio recording mode, or voice-and-video chat mode, each of which might be served best by vastly different resource configurations). Different applications whose primary purpose is audio/video recording may share a first group of settings that are optimal for the recording purpose, while different applications whose primary purpose is audio/video chat may share a second, different group of settings that are optimal for the chat purpose.

Using these techniques, developers of applications having similar purposes will tend to program their applications to refer to similar documented mode identifiers when configuring their allocated resources. As a consequence, applications having similar purposes will tend to have similar resource settings, thereby increasing the likelihood that users of different but similarly-purposed applications will have their expectations of the resource settings for those applications satisfied.

Thus, while resource category identifiers map to subsets of device resources, such as hardware resources and software processing resources, setting mode identifiers instead map to groups of settings with which device resources are to be configured. As is discussed above, each category optionally may be mapped to a default mode which will be applied to that category's resources unless a different mode is expressly specified.

Exclusive Mediation of Resources and Settings

According to certain embodiments of the invention disclosed herein, the operating system exposes, to applications, an interface through which those applications can specify category identifiers and mode identifiers. In certain embodiments of the invention, the operating system prevents applications from directly reserving the use of device resources in any manner that would circumvent this interface. Therefore, in such embodiments of the invention, the operating system effectively mediates the reservation of device resources on behalf of applications rather than allowing those applications to reserve those device resources more directly.

Mode Examples and Application Purpose

The resource configuration settings that are desirable for an audio/video-recording-only mode differ from the resource configuration settings that are desirable for an audio/video chat mode, even if one or more of the resources that are being used in both modes are the same resources. The gain structures for one mode would not be appropriate for the other mode; the appropriate analog gain level setting for one mode is different than the appropriate analog gain level for the other mode. The ideal audio sample rate for one mode would not be an ideal audio sample rate for the other mode.

For a more specific example, in one embodiment of the invention that relates to settings for a mobile telephone device having audio and video transmitting and receiving capabilities (e.g., an iPhone), at least two separate modes are defined and mapped to different mode identifiers. A first mode, mapped to a first mode identifier, is a "video recording mode." A second mode, mapped to a second mode identifier, is a "voice chat mode."

In such an embodiment of the invention, when an application specifies the "video recording mode," the operating system will, by default, cause audio input for the application to be obtained through the top microphone of the device rather than the bottom microphone of the device. Additionally, the operating system will apply a first specified microphone gain value to the top microphone. Additionally, the operating system will route the received audio input data for the application through a first digital signal processing (DSP) chain of processing modules (potentially implemented in software) that have been tuned specifically for video recording purposes, such as a tonal equalization mode, a dynamics processing module, etc. Additionally, the operating system will cause audio output from the application to be directed to a built-in loudspeaker of the device (rather than the device's receiver that one holds up to one's ear) by default. All of these settings are mapped to the "video recording mode" identifier.

By way of contrast, in such an embodiment of the invention, when an application specifies the "voice chat mode," the operating system will, by default, cause audio input for the application to be obtained from the bottom microphone of the device rather than the top microphone. Additionally, the operating system will route the received audio input data for the application through a second DSP chain of processing modules (again, potentially implemented in software) that differs from the first DSP chain. Unlike the first DSP chain discussed above, the second DSP chain does not apply dynamics processing to the signal obtained from the built-in microphone prior to the application of echo cancellation to that signal, because dynamics processing can lead to non-linear distortion, which is not good for the echo canceller. Additionally, the operating system will apply specified minimum and maximum output volume values to microphones and headphones under certain circumstances. Additionally, the operating system will cause audio output from the application to be directed to the receiver of the device (which one holds up to one's ear) rather than the device's loudspeaker by default when the device's built-in microphone is being used. Additionally, the operating system will allow Bluetooth headsets to be used within signal routes in this mode. All of these settings are mapped to the "voice chat mode" identifier.

Although two specific modes are described above, each having a different group of settings that are used to configure a device's hardware and software resources, embodiments of the invention are not limited to any specific set of modes. Various different modes, each mapped to different groups of settings, are contemplated in various embodiments of the invention.

It should be noted that both "video recording mode" and "voice chat mode" express different application purposes, or fundamentally different intents in the way that the device is going to be operated, each calling for a significantly different group of settings. The "video recording mode" contemplates that the device is going to be used like a camcorder, held far away from the user's face with the device's cameras directed toward a focus other than the user. In contrast, the "voice chat mode" contemplates that the device is going to be used like a telephone, held close to the user's face with the device's receiver relatively close to the user's ear. Even though the sets of device resources that each type of application uses may have at least some minimum overlap, the appropriate or ideal settings for even those resources may different significantly for those types of applications.

Resolving Conflicting Mode Settings

Under some circumstances, a device may execute multiple applications concurrently. Each of these applications may request that a different mode be used. Potentially, the modes of two or more concurrently executing applications may specify different settings for the same device resource (e.g., a microphone or speaker). In one embodiment of the invention, in response to determining that a conflict has developed in the modes that two or more different applications have requested, in that those applications desire different settings for the same resource, the operating system automatically performs a priority-based conflict resolution.

If the operating system determines that the two modes are mutually exclusive, such that one application cannot function properly if the other application's mode is applied to the particular resource, then the operating system may select one of the applications and honor only the selected application's request to apply its mode's settings to the particular resource.

Signal Routes

As is disclosed in U.S. Pat. No. 7,861,008, titled "MEDIA MANAGEMENT AND ROUTING WITHIN AN ELECTRONIC DEVICE," category identifiers may be mapped with routes through which a signal is to travel within a device. Each route may indicate a sequence of an input resource, zero or more processing resources, and/or an output resource. For example, a particular route might indicate that audio input that is received through a top microphone of a device is to be passed to a tonal equalizer module, whose processed output is to be passed to an echo-cancelling module, whose processed output is to be passed to an application. For another example, a particular route might indicate that audio output that is produced by an application is to be passed to a tonal equalizer module, whose processed output is to be passed to a dynamic processing module, whose processed output is to be passed to a loudspeaker of the device. Different category identifiers may be mapped to different routes. In one embodiment of the invention, in response to an application's specification of a particular category identifier to the operating system, the operating system establishes a route that is specified by that particular category identifier, and causes signal data to follow that route.

In one embodiment of the invention, mode identifiers are mapped to groups of setting that indicate settings with which specified resources and specified modules within that route are to be configured. Such settings may include, for example, analog gain levels, audio sample rates, and/or digital signal processing module chains—each including a sequence of digital signal processing modules, minimum and/or maximum volume levels, etc. In one embodiment of the invention, in response to an application's specification of a particular mode identifier to the operating system, the operating system configures the hardware resources and processing modules within that route in conformity with the settings that are mapped to the particular mode identifier. Consequently, as the elements within the route process signal data, those elements do so in a manner that is dictated by the settings with which those elements have been configured.

Example Flow

Figure 5:
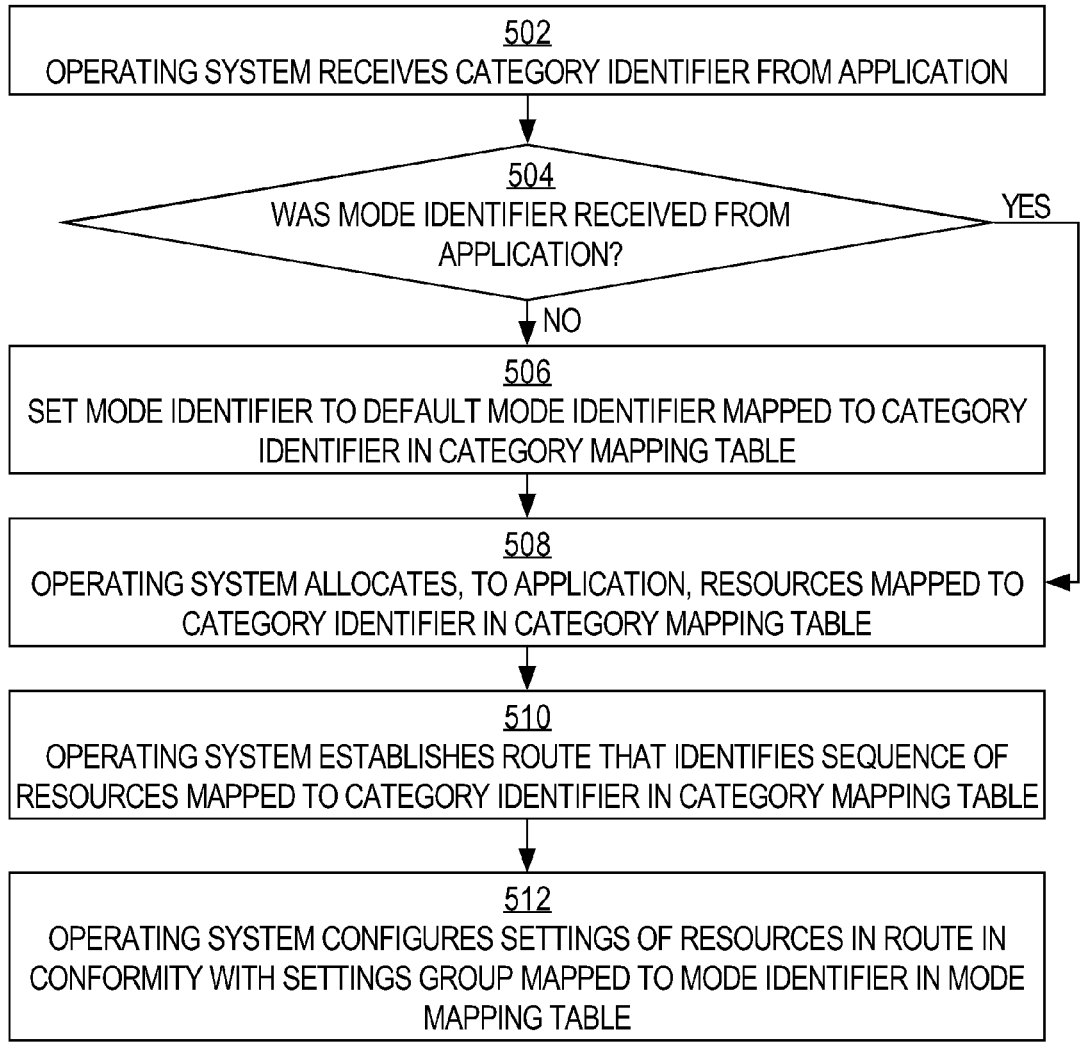
FIG. 5 is a flow diagram that illustrates an example technique for configuring a device's resources in conformity with a mode identifier, according to an embodiment of the invention.

FIG. 5 is a flow diagram that illustrates an example technique for configuring a device's resources in conformity with a mode identifier, according to an embodiment of the invention. In block 502, an operating system executing on the device receives, from an application executing on the device, a category identifier that identifies a particular category of hardware resources. The particular category is one of several categories, each of which is mapped in the category mapping table to a different subset of the device's resources, though the elements of some subsets may be shared with other subsets. The resources to which the particular category is mapped represent the set of resources that the application needs to use in order to function. In one embodiment of the invention, the operating system receives the category identifier as a parameter of a method that an application programming interface exposes to the application.

In block 504, the operating system determines whether a mode identifier was received from the application. In one embodiment, the operating system receives the mode identifier as a parameter of a method that an application programming interface exposes to the application—potentially the same method through which the operating system received the category identifier. If a mode identifier was specified by the application, then control passes to block 508. Alternatively, if a mode identifier was not specified by the application, then control passes to block 506.

In block 506, the operating system sets the mode identifier to be a default mode identifier that is mapped to the category identifier in the category mapping table. Control passes to block 508.

In block 508, the operating system allocates, to the application, use of each of the resources in the subset of resources that is mapped to the category identifier.

In block 510, the operating system establishes a route that identifies a sequence or chain of resources and/or processing modules through which signals, such as audio signals, are to be passed for the application. The mode can also affect the route selection. The category and mode work together to influence the routing.

In block 512, the operating system configures settings of resources and/or processing modules within the established route in conformity with a group of settings that is mapped to the mode identifier in the mode mapping table. The operations of block 512 optionally may include resolving conflicts between modes that specify different settings for the same resource, in the manner discussed above.

Using the foregoing technique, applications more expressly designate their intended purposes to a device on which those application execute, so that the device can more appropriately and ideally configure the settings of resources that will be used by those applications, without those applications needing to separately and individually specify settings for each separate resource that those application will use.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
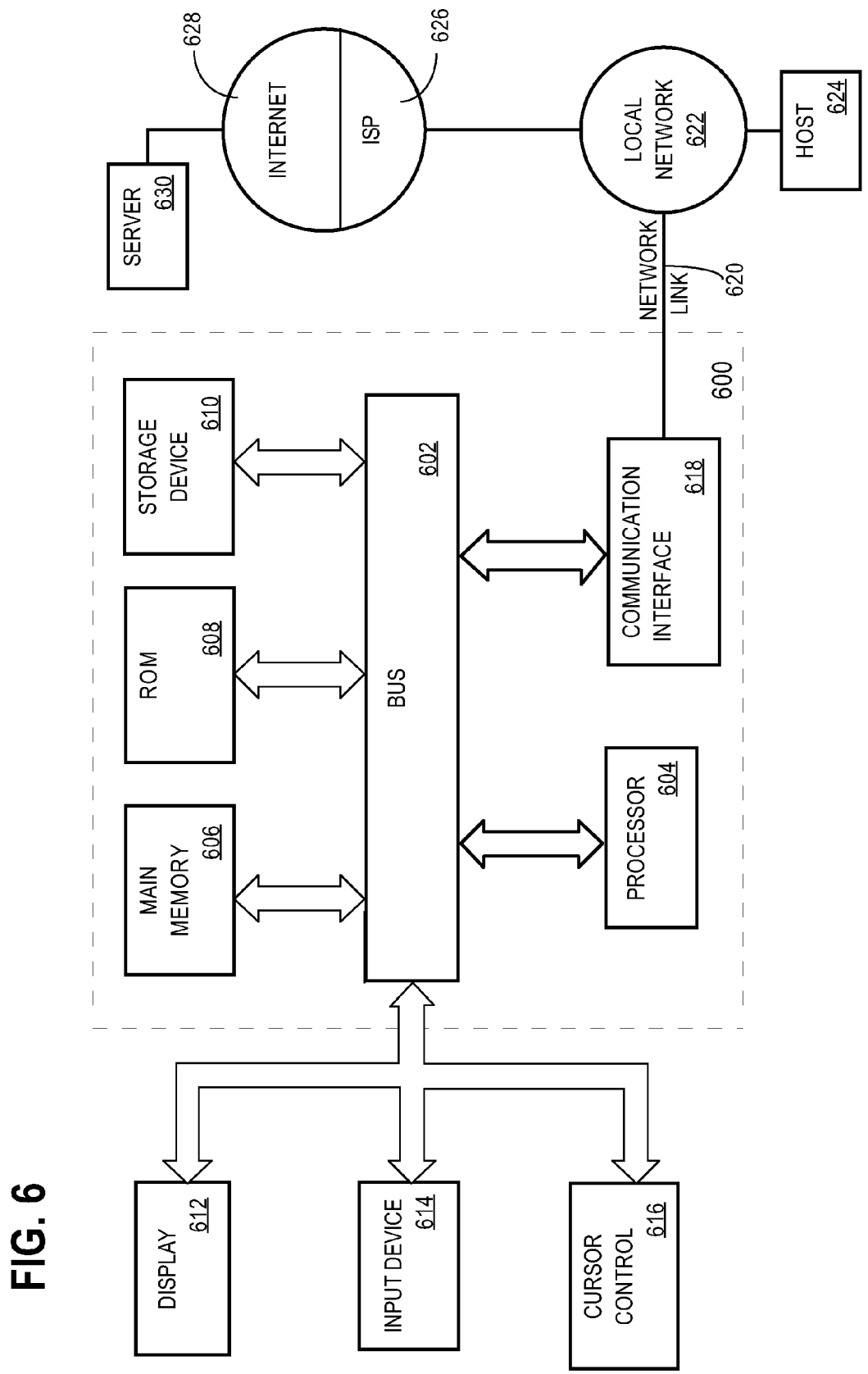
FIG. 6 is a block diagram of a computer system according to an embodiment of the invention.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, from an application, first data that identifies a particular category of hardware resources, of a plurality of categories of hardware resources, the particular category of hardware resources representing a set of hardware resources that are required to be allocated to the application in order for the application to function, wherein each category in the plurality of categories is mapped to a different set of hardware resources of a device on which the application is executing, wherein the first data includes at least one category identifier representing the particular category of hardware resources;
receiving, from the application, second data that identifies a particular mode of a plurality of modes, wherein the particular mode of the plurality of modes corresponds to an intended use of the set of hardware resources based on a configuration setting of the particular category of hardware resources, and wherein the particular mode is mapped to the configuration setting of the particular category of hardware resources, the configuration setting consistent with the intended use of the application, wherein the second data includes at least one mode identifier representing the particular mode; and
in response to receiving the first data and the second data, allocating, to the application, the set of hardware resources represented by the particular category and the particular mode, and configuring one or more hardware resources in the set of hardware resources in conformity with the configuration setting mapped to the particular mode, wherein the first data differs from the second data;
wherein the method is performed by one or more computing devices.

2. The method of claim 1, wherein the plurality of categories includes a first category and a second category, wherein the first category specifies at least a first audio input of the device and a first audio output of the device, and wherein the second category specifies at least a second audio input of the device and a second audio output of the device, wherein the first audio input differs from the second audio input, and wherein the first audio output differs from the second audio output.

3. The method of claim 1, wherein the plurality of modes includes a first mode and a second mode, wherein the first mode specifies a first analog gain level for a particular resource of the device, and wherein the second mode specifies a second analog gain level for the particular resource, wherein the first analog gain level differs from the second analog gain level, and wherein the particular resource is either an audio input resource of the device or an audio output resource of the device.

4. The method of claim 1, wherein the plurality of modes includes a first mode and a second mode, wherein the first mode specifies a first audio sample rate to be applied to a particular audio signal, and wherein the second mode specifies a second audio sample rate to be applied to the particular audio signal, wherein the first audio sample rate differs from the second audio sample rate, and wherein the particular audio signal represents either audio input received from a particular audio input resource of the device or audio output to be played by a particular audio output resource of the device.

5. The method of claim 1, wherein the plurality of modes includes a first mode and a second mode, wherein the first mode specifies a first chain of digital signal processors that are to be applied to a particular signal, and wherein the second mode specifies a second chain of digital signal processors that are to be applied to the particular signal, wherein the first chain differs from the second chain, and wherein the particular signal is either a signal received through a particular input resource of the device or a signal to be played by a particular output resource of the device.

6. The method of claim 5, wherein the first chain includes a dynamic processing module that processes a particular signal prior to the particular signal being fed to an echo cancelling module, and wherein the second chain does not include a dynamic processing module that processes the particular signal prior to the particular signal being received by the echo-cancelling module.

7. The method of claim 1, wherein the plurality of modes includes a first mode and a second mode, wherein the first mode specifies that audio input for the application is to be received through a first microphone of the device, and wherein the second mode of the plurality of modes specifies that audio input for the application is to be received through a second microphone of the device, and wherein the first microphone is positioned at a location on the device that differs from a location on the device at which the second microphone is positioned.

8. The method of claim 1, wherein the plurality of modes includes a first mode and a second mode, wherein the first mode specifies that audio output from the application is to be transmitted through a first speaker of the device, and wherein the second mode of the plurality of modes specifies that audio output from the application is to be transmitted through a second speaker of the device, and wherein the first speaker is positioned at a location on the device that differs from a location on the device at which the second speaker is positioned.

9. The method of claim 1, wherein the plurality of modes includes a first mode and a second mode, wherein the first mode specifies a first volume level for a particular hardware resource of the device, and wherein the second mode of the plurality of modes specifies a second volume level for the particular hardware resource, and wherein the first volume level differs from the second volume level.

10. A non-transitory computer readable medium comprising instructions which when executed by at least one processor causes the at least one processor to perform a method, the method comprising:
receiving, from an application, first data that identifies a particular category of hardware resources, of a plurality of categories of hardware resources, the particular category of hardware resources representing a set of hardware resources that are required to be allocated to the application in order for the application to function, wherein each category in the plurality of categories is mapped to a different set of hardware resources of a device on which the application is executing, wherein the first data includes at least one category identifier representing the particular category of hardware resources;
receiving, from the application, second data that identifies a particular mode of a plurality of modes, wherein the particular mode of the plurality of modes corresponds to an intended use of the set of hardware resources based on a configuration setting of the particular category of hardware resources, and wherein the particular mode is mapped to the configuration setting of the particular category of hardware resources, the configuration setting consistent with the intended use of the application, wherein the second data includes at least one mode identifier representing the particular mode; and in response to receiving the first data and the second data, allocating, to the application, the set of hardware resources represented by the particular category and the particular mode, and configuring one or more hardware resources in the set of hardware resources in conformity with the configuration setting mapped to the particular mode, wherein the first data differs from the second data.

11. The non-transitory computer readable medium of claim 10, wherein a first mode of the plurality of modes is a default mode.

12. The non-transitory computer readable medium of claim 10, wherein the method further comprises:
setting a first hardware resource in the set of hardware resources in conformity with a first setting that is mapped to the particular mode; and
setting a second hardware resource in the set of hardware resource in conformity with a second setting that is mapped to the particular mode.

13. The non-transitory computer readable medium of claim 10, wherein receiving, from the application, the second data that identifies a particular mode of a plurality of modes comprises receiving a particular mode identifier as a parameter passed to a method exposed by an application programming interface.

14. The non-transitory computer readable medium of claim 10, wherein the particular category of hardware resources is mapped, in a category mapping table, to a first default mode that corresponds to a first mode in a mode mapping table.

15. The non-transitory computer readable medium of claim 10, wherein the category mapping table maps a second category, having a second category identifier, to a second default mode that differs from the first default mode.

16. The non-transitory computer readable medium of claim 10, wherein each mode of the plurality of modes corresponds to a different intended use of hardware resources of the device.

17. The non-transitory computer readable medium of claim 10, wherein a first mode of the plurality of modes indicates settings that are consistent with use of the device in an audio chat context.

18. The non-transitory computer readable medium of claim 10, wherein a first mode of the plurality of modes indicates settings that are consistent with use of the device in a video recording context.

19. The one or more non-transitory storage media of claim 10, wherein a first mode of the plurality of modes indicates a first volume level for a particular hardware resource of the device.

20. A method comprising:
receiving, from a first application, a first mode identifier that corresponds to a particular intended use of a device on which the application executes, wherein the first mode identifier is mapped, in a table, to a plurality of settings for a plurality of resources of the device, wherein the first mode identifier is mapped to a first category identifier of a first category, the first category representing a set of hardware resources that are required to be allocated to the application in order for the application to function, and wherein the plurality of resources of the device includes at least one of an audio input resource or an audio output resource, and wherein the table maps a plurality of different mode identifiers to different groups of settings for different subsets of resources of the device; and configuring one or more resources of the device with the plurality of settings to which the first mode identifier is mapped;

wherein the method is performed by one or more computing devices.

21. The method of claim 20, further comprising:
receiving, from a second application, a second mode identifier that corresponds to a second intended use of the device, wherein the second intended use differs from the first intended use, wherein the second application utilizes a same set of resources that the first application utilizes, wherein the second mode identifier is mapped to the first category identifier; and
configuring the set of resource with one or more settings that are mapped to the second mode identifier, wherein the one or more settings that are mapped to the second mode identifier differ from the one or more settings that are mapped to the first mode identifier.

22. A non-transitory computer readable medium comprising instructions which when executed by at least one processor causes the at least one processor to perform a method, the method comprising:
receiving, from a first application, a first mode identifier that corresponds to a particular intended use of a device on which the application executes, wherein the first mode identifier is mapped, in a table, to a plurality of settings for a plurality of resources of the device, wherein the first mode identifier is mapped to a first category identifier of a first category, the first category representing a set of hardware resources that are required to be allocated to the application in order for the application to function, and wherein the plurality of resources of the device includes at least one of an audio input resource or an audio output resource, and wherein the table maps a plurality of different mode identifiers to different groups of settings for different subsets of resources of the device; and configuring one or more resources of the device with the plurality of settings to which the first mode identifier is mapped.

23. The non-transitory computer readable medium of claim 22, wherein the table maps the first mode identifier to a first group of settings that are consistent with use of the device in an audio-only chat mode, wherein the table maps a second mode identifier to a second group of settings that are consistent with use of the device in a video recording mode, wherein the table maps a third mode identifier to a third group of settings that are default settings, and wherein the table maps a fourth mode identifier to a fourth group of settings that are related to a volume level for a particular hardware resource of the device, wherein the first mode identifier, the second mode identifier, the third mode identifier, and the fourth mode identifier are each mapped to the first category identifier.

24. A device comprising:
two or more audio inputs;
two or more audio outputs;
two or more digital signal processing modules;
memory storing a category mapping table that maps at least a first category identifier to a first subset of the audio inputs, audio outputs, and digital signal processing modules, and further maps at least a second category identifier to a second subset of the audio inputs, audio outputs, and digital signal processing modules;

memory storing a mode mapping table that maps at least a first mode identifier to a first group of settings applicable to a subset of the audio inputs, audio outputs, and digital signal processing modules, and further maps at least a second mode identifier to a second group of settings applicable to a subset of the audio inputs, audio outputs, and digital signal processing modules;

memory storing a first application that specifies, via the first category identifier, that the first application needs the first subset allocated to the first application and specifies, via the first mode identifier, that the first application needs the first group of settings applied to resources in the first subset, wherein the first category identifier is mapped to the first mode identifier; and memory storing a second application that specifies, via the second category identifier, that the second application needs the second subset allocated to the second application and specifies, via the second mode identifier, that the second application needs the second group of settings applied to resources in the second subset, wherein the second category identifier is mapped to the second mode identifier;

wherein the first and second groups of settings specify at least one of: analog gain levels, audio sample rates, digital signal processor chains, microphones of the device that are to be used to receive audio input, speakers of the device that are to be used to transmit audio output, or at least one of minimum or maximum volume levels.

25. The method of claim 1, wherein the particular mode is capable of being associated with a different set of hardware resources represented by a different category.

26. The non-transitory computer readable medium of claim 10, wherein the particular mode is capable of being associated with a different set of hardware resources represented by a different category.

* * * * *

UNITED STATES PATENT AND TRADEMARK OFFICE
CERTIFICATE OF CORRECTION

Page 1 of 1

PATENT NO. : 8,838,261 B2
APPLICATION NO. : 13/294922
DATED : September 16, 2014
INVENTOR(S) : William G. Stewart et al.

It is certified that error appears in the above-identified patent and that said Letters Patent is hereby corrected as shown below:

On the title page item (75), add -- Douglas Wyatt, Portola Valley, CA (US) --.

Signed and Sealed this
Twelfth Day of May, 2015

Michelle K. Lee
*Director of the United States Patent and Trademark Office*